(12) United States Patent
Adachi et al.

(10) Patent No.: US 8,851,436 B2
(45) Date of Patent: Oct. 7, 2014

(54) CUP HOLDER

(75) Inventors: Takefumi Adachi, Sagamihara (JP);
Tsuyoshi Hamaguchi, Sagamihara (JP)

(73) Assignee: Nifco Inc., Yokohama-Shi (JP)

( * ) Notice: Subject to any disclaimer, the term of this patent is extended or adjusted under 35 U.S.C. 154(b) by 0 days.

(21) Appl. No.: 13/642,366

(22) PCT Filed: Apr. 21, 2011

(86) PCT No.: PCT/JP2011/059872
§ 371 (c)(1),
(2), (4) Date: Dec. 20, 2012

(87) PCT Pub. No.: WO2011/132754
PCT Pub. Date: Oct. 27, 2011

(65) Prior Publication Data
US 2013/0092808 A1    Apr. 18, 2013

(30) Foreign Application Priority Data
Apr. 22, 2010    (JP) ................. 2010-098483

(51) Int. Cl.
*A47K 1/08* (2006.01)

(52) U.S. Cl.
USPC ..................... 248/311.2; 248/312.1

(58) Field of Classification Search
USPC ............ 248/311.2; 224/926; 297/188.14
See application file for complete search history.

(56) References Cited

U.S. PATENT DOCUMENTS

| | | | |
|---|---|---|---|
| 5,342,009 A * | 8/1994 | Lehner | 248/311.2 |
| 6,095,471 A * | 8/2000 | Huang | 248/311.2 |
| 6,427,960 B1 * | 8/2002 | Gehring et al. | 248/311.2 |
| 2003/0015638 A1 | 1/2003 | Yamada | |
| 2009/0173862 A1 * | 7/2009 | Lota | 248/311.2 |

FOREIGN PATENT DOCUMENTS

| | | |
|---|---|---|
| JP | H08-318775 A | 12/1996 |
| JP | 10-272979 A | 10/1998 |
| JP | H10-272979 A | 10/1998 |
| JP | 2861801 B2 | 2/1999 |
| JP | 2002-337595 A | 11/2002 |
| JP | 2003-34172 A | 2/2003 |
| JP | 2003-165375 A | 6/2003 |

OTHER PUBLICATIONS

PCT, "International Search Report for PCT/JP2011/132754" May 31, 2011.
Europe Patent Office, "European Search Report for EP 11772086.2," Dec. 2, 2013.
Japan Patent Office, "Office action for JP2010-098483," Dec. 3, 2013.

* cited by examiner

*Primary Examiner* — Amy J Sterling
(74) *Attorney, Agent, or Firm* — Manabu Kanesaka

(57) ABSTRACT

The cup holder includes a base adapted to be fixed to an attached portion; a lid body provided switchably between a closed position and an open position by turning relative to the base, overlapped with the base in the closed position, and supporting the cup from a lower side thereof in the open position; and a holder supported at the base or the lid body through an arm, and moving in association with a turning of the lid body to become a housed state when the lid body is in the closed position, and to become a used state when the lid body is in the open position. The arm includes a support portion controlling the lateral movement of the cup in the used state of the holder.

4 Claims, 10 Drawing Sheets

CUP HOLDER

FIELD OF TECHNOLOGY

The present invention relates to a cup holder capable of holding a cup.

BACKGROUND ART

Figure 8A:
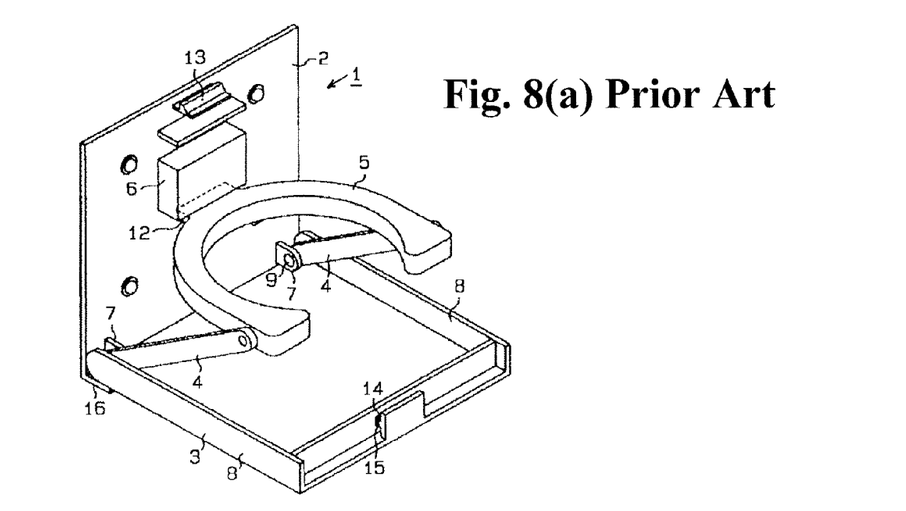
FIG. 8(a) is a perspective view of a cup holder 1 disclosed in Patent Document 1.
Figure 8B:
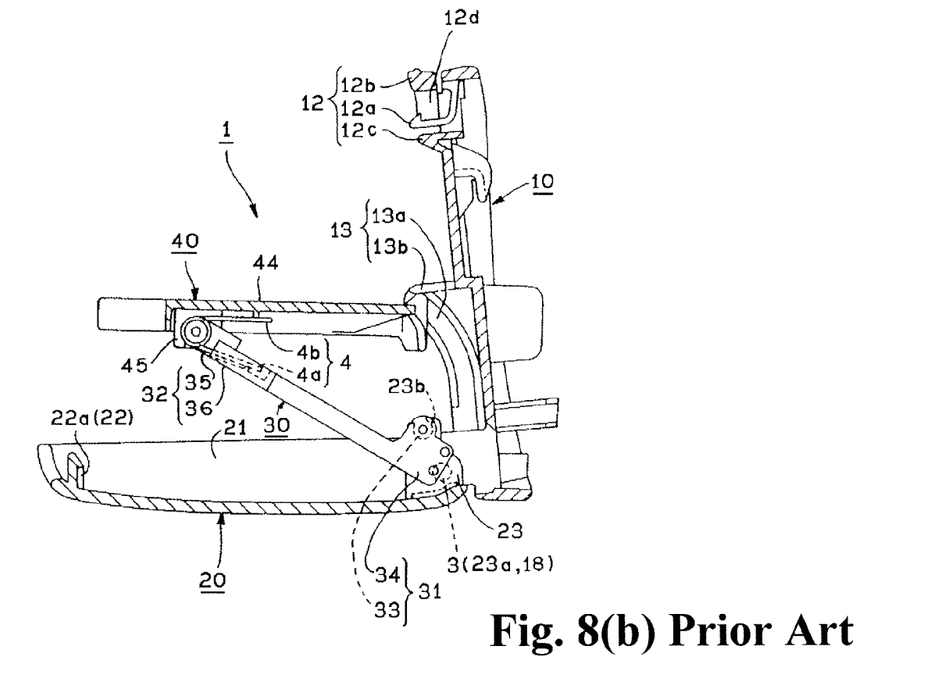
FIG. 8(b) is a vertical cross-sectional view of a cup holder device 1 disclosed in Patent Document 2.

FIG. 8(a) is a perspective view of a cup holder 1 disclosed in the following Patent Document 1, and FIG. 8(b) is a vertical cross-sectional view of the cup holder device 1 disclosed in the following Patent Document 2. The cup holder 1 disclosed in the Patent Document 1 comprises a base plate 2 fixed into a predetermined attachment portion; a tray 3 turnably attached to the base plate 2, and capable of switching between a closed position and an open position by turning the tray 3 relative to the base plate 2; and a support 5 supported in one of the base plate 2 or the tray 3 through arms 4. Also, the cup holder device 1 disclosed in the Patent Document 2 comprises a base 10 which corresponds to the base plate 2 of the aforementioned cup holder 1; a lid body 20 which corresponds to the tray 3 of the aforementioned cup holder 1; and a holder 40 which corresponds to the support 5 of the aforementioned cup holder 1. Then, the support 5 of the cup holder 1 and the holder 40 of the cup holder device 1 move in association with the turning of the tray 3 or the lid body 20, and when the tray 3 or the lid body 20 is in the closed position, the support 5 of the cup holder 1 and the holder 40 of the cup holder device 1 come to a housed state housed in the base plate 2 or the base 10. When the tray 3 or the lid body 20 is in the open position, the support 5 of the cup holder 1 and the holder 40 of the cup holder device 1 come to a used state positioned on an upper side of the tray 3 or the lid body 20. Incidentally, both the tray 3 of the cup holder 1 and the lid body 20 of the cup holder device 1 function as a bottom receiver of a cup in the used state. Also, in both the support 5 and the holder 40, there is provided a holding hole for restraining a circumference of the cup placed on the tray 3 or the lid body 20 in the used state.

Also, as shown in FIG. 8(a), one end of the arm 4 of the aforementioned cup holder 1 is pivotally supported at a protruding piece 7 provided in the base plate 2 through a support axis 9, and the other end is turnably connected to a corresponding portion of the support 5. Also, the arm 4 is urged in a direction of rising by a torsion coil spring (a first urging member) which is not shown in the figure and is disposed between the arm 4 and the lid body 3. In the support 5, there is provided an urging force in a direction of attempting to move the support 5 into a position at a time of the used state by a torsion coil spring (a second urging member) which is not shown in the figure and is disposed between the support 5 and the arm 4. On the other hand, as shown in FIG. 8(b), one end of an arm 30 of the aforementioned cup holder device 1 is pivotally supported at a support piece portion 23 provided in the lid body 20 through an axis portion 33, and the other end is turnably connected to a corresponding portion of the holder 40. Also, in the holder 40, there is provided an urging force in a direction of moving the holder 40 in the position at the time of the used state by a spring member 4 disposed between the holder 40 and the arm 30.

PRIOR ART DOCUMENTS

Patent Documents

Patent Document 1: Japanese Patent No. 2861801

Patent Document 2: Japanese Unexamined Patent Publication No. 2002-337595

SUMMARY OF THE INVENTION

Problems to be Solved by the Invention

In the aforementioned cup holder 1 and cup holder device 1, in the used state, when the cup is inserted into the holding hole of the support 5 or the holder 40, a lateral face of the cup is restrained and held by the holding hole, and also a bottom face of the cup is supported from a lower side by the tray 3 or the lid body 20. Thus, the cup holder 1 and the cup holder device 1 can hold the cup so that it does not fall. Meanwhile, in order to allow the cup holder to hold the cup in a more stable state, for example, in the aforementioned cup holder 1 and cup holder device 1, a slip-preventing rib may be additionally provided on an upper surface (a holding surface of the cup) of the tray 3 or the lid body 20, or a shallow concaved portion, which has an approximately equal shape to a shape of the bottom face of the cup, may be provided so as to control a movement of the cup, and the like. Also, inside the holding hole in the support 5 or the holder 40, the holding surface abuttable against the lateral face of the cup may be formed as widely as possible. However, especially, the latter device can not be used since the cup holder becomes large in size. More specifically, for example, if an area of an abutted surface (the holding surface) against the lateral face of the cup is enlarged by making an inner surface of the aforementioned support 5 or holder 40 to be a cylinder shape long in the up and down direction, or a half cylinder shape, when the cup holder 1 or the cup holder device 1 is in the closed position, it becomes difficult to house the support 5 or the holder 40 between the base plate 2 or the base 10, and the tray 3 or the lid body 20, so that there is a problem that a whole thickness comes large.

The present invention has an object to solve the aforementioned problem, and more specifically, the object of the present invention is to provide a cup holder which can hold the cup more stably without enlarging the whole size, or without impairing an assembly property or a simplified property.

Means for Solving the Problems

For the object of solving the aforementioned problem, the present invention provides a cup holder including any characteristic of the following (1) to (6).

(1) There is provided a cup holder, which comprises a base adapted to be fixed to an attached portion; a lid body provided switchably between a closed position and an open position by turning relative to the base, overlapped with the base in the aforementioned closed position, and supporting a cup from a lower side thereof so as to receive a bottom of the cup in the open position; and a holder supported in the base or the lid body through an arm, and moving in association with the turning of the lid body to become a housed state, in which the holder is housed between the lid body and the base, when the lid body is in the closed position, and to become a used state, in which the holder controls a lateral movement of the cup when the lid body is in the open position. The aforementioned arm includes a support portion controlling the lateral movement of the cup in the used state of the holder.

(2) Also, in the cup holder of the aforementioned (1), the holder includes a holding hole controlling the lateral movement of the cup in the used state, and the support portion and the holding hole have a substantially equal curvature in a horizontal direction in an abutted surface respectively against the cup.

(3) Also, in the cup holder of the aforementioned (1) or (2), the arm is turnably connected to a corresponding portion of the holder through a first pivotal supporting portion, and also is turnably connected to a corresponding portion of the base or the lid body through a second pivotal supporting portion. The first pivotal supporting portion and the second pivotal supporting portion are provided as a pair on both sides clamping the support portion, and the support portion is an elastically deformable thin-walled shape. Here, the first pivotal supporting portion is structured by, for example, an axis hole or a bearing concave portion provided on either the arm or the holder, and an axis portion provided on the other arm or the holder. Also, the second pivotal supporting portion is structured by, for example, an axis hole or a bearing concave portion provided on either the arm, the base, or the lid body, and an axis portion provided on the other arm, the base, or the lid body.

(4) Also, in the cup holder according to any of the aforementioned (1) to (3), the support portion is disposed below the holding hole in the used state of the holder, and abuts against a lateral face of the cup disposed between the holding hole and the lid body.

Effect of the Invention

In the cup holder including the characteristic of the aforementioned (1), since the support portion controlling the lateral movement of the cup is provided in the arm, compared to a case where the lateral movement of the cup is controlled only by the holder, the cup can be held in a more stable state, so that the cup does not widely incline due to an impact and the like. Also, since the support portion is formed in one portion of the arm, a holding property of the cup can be improved without increasing the number of members and assembly hours.

In the cup holder including the characteristic of the aforementioned (2), the abutted surface against the cup in the support portion formed in the arm, and the abutted surface against the cup in the holding hole provided in the holder have the substantially equal curvature in the horizontal direction so as to be capable of more stably holding the cup especially having the same radius of a top and bottom in a case where the cup holder holds the cup.

In the cup holder having the characteristic of the aforementioned (3), at an assembly time of the cup holder, when each pivotal supporting portion in the arm is fitted relative to the corresponding portion, the support portion is elastically deformed so as to be easily fitted. Accordingly, the cup holder excels in an operability at the assembly time.

In the cup holder having the characteristic of the aforementioned (4), for example, in the used state of the holder, the support portion of the arm is positioned below the holding hole, so that the support portion of the arm is difficult to be seen, for example, from an obliquely upward angle. Accordingly, by providing the support portion in the arm, an appearance cannot be impaired.

BEST MODES OF CARRYING OUT THE INVENTION

Hereinafter, a preferred embodiment of the present invention will be explained with reference to drawings. In the hereinafter-described explanation, a structure of members composing a cup holder 6 according to one embodiment of the present invention, an assembly of component members, a locking device, and an actuation will be described in detail in that order.

(Structure of Component Members)

Figure 1A:
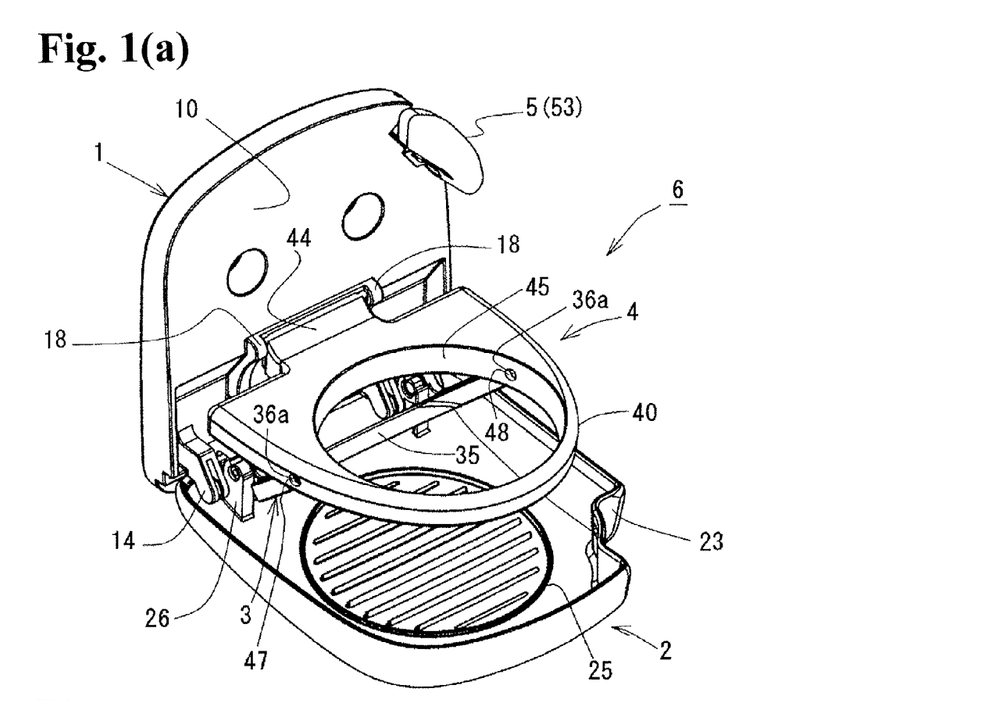
FIG. 1(a) is a perspective view when a lid body 2 is in an open position in a cup holder 6 according to an embodiment of the present invention.
Figure 1B:
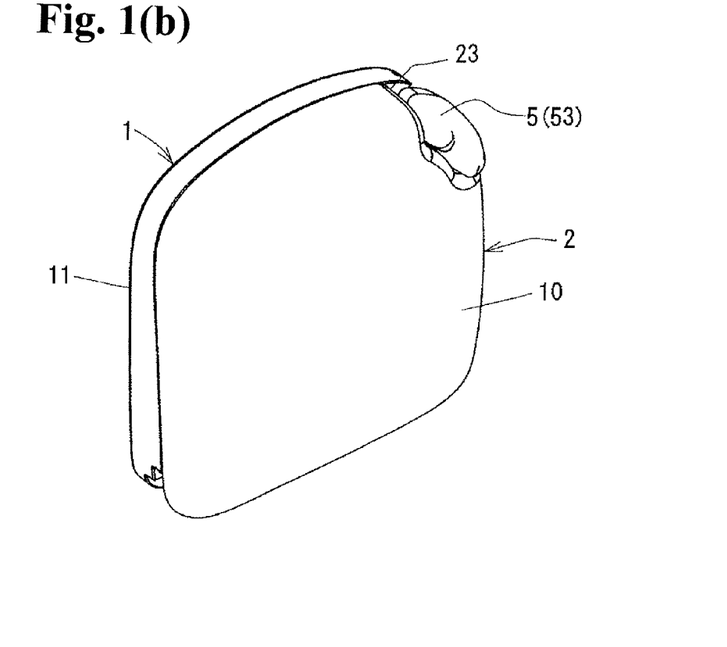
FIG. 1(b) is a perspective view of the cup holder 6 when the lid body 2 is in a closed position.

The cup holder 6 according to the present embodiment is a vertical type which is attached in a vertical direction relative to an attached portion 8, and comprises a base 1 attached to the attached portion 8; a lid body 2 pivotally supported turnably relative to the base 1, and provided switchably between a closed position and an open position; a holder 4 supported in the lid body 2 through an arm 3; and a locking device 5 holding the lid body 2 in the closed position relative to the base 1. Then, the holder 4 turns in association with the turning of the lid body 2, and when the lid body 2 is in the closed position shown in FIG. 1(b), the holder 4 comes to a housed state housed between the lid body 2 and the base 1, and when the lid body 2 is in the open position shown in FIG. 1(a), the holder 4 comes to a used state protruding in an approximately horizontal direction. Then, in the aforementioned used state, the holder 4 controls a lateral movement of a cup 9 placed on the lid body 2. Here, the attached portion 8 may be a vertical wall, for example, a door trim, a seat, a console box, an instrument panel, and the like composing a vehicle interior of an automobile. Incidentally, the attached portion 8 is not limited to the above, and may be, for example, a seat surrounding portion and the like of a train, a ship, an aircraft, and the like. Also, the cup 9 which is held by the cup holder 6 of the present example includes, for example, a can, a glass, a drink carton, a bottle, and the like. Also, in the cup holder 6 of the present example, all of the base 1, the lid body 2, the arm 3, and the holder 4 are resin molding bodies. However, materials of each component are not limited to resin.

As shown in FIGS. 2(a), 2(b), 2(c), and FIG. 6, the base 1 has an approximately rectangular shape. The base 1 includes attachment holes 1a provided on upper right and left and passing through inner and outer surfaces 10 and 11; a notch portion 12 provided on an upper piece side of the inner surface 10 and assembling a locking device 5; protruding piece portions 14 and 16 respectively provided to protrude on lower right and left of the inner surface 10; guide grooves 18 provided on an upper side of the protruding piece portions 16 on both sides; positioning protrusions 19 provided to protrude on the outer surface 11 and engaged with a positioning hole portion 8a provided in the attached portion 8; and the like.

Among the above, on a lower side of the inner surface 10, there are provided right-and-left depression portions 13a and 13a and an intermediate depression portion 13b. In the depression portions 13a and 13a, there are provided the protruding piece portions 14 and 16 as a pair side by side. The protruding piece portions 14 and the protruding piece portions 16 on both sides are provided by maintaining a gap into which piece portions 26 on the later-mentioned lid body 2 side easily fit. Also, the protruding piece portions 14 and the protruding piece portions 16 include an axis portion 15 which protrudes from a lateral face of the protruding piece 14 toward the protruding piece portion 16; and an axis portion 15 which protrudes from one lateral face (depression portion 13b side) of the protruding piece 16 toward the protruding piece portion 14. The axis portion 15 of the protruding piece portion 14 and the axis portion 15 of the protruding piece portion 16 are provided on a coaxial line. The protruding piece portions 16 on both sides are provided near both sides of the intermediate depression portion 13b, and also are connected to guide portions 17 extending to the upper side. Each guide portion 17 forms the guide groove 18 on an opposing lateral face.

The notch portion 12 makes a concave shape from an inner surface 10 side, and forms engagement grooves 12a facing an inside of the concave shape; an escape hole 12b passing through a bottom face of the concave shape; and an attachment hole 12c passing through a depression portion 11a of the outer surface 11 from an inner end surface. Then, in the notch portion 12, there is disposed the later-mentioned locking device 5.

As shown in FIGS. 1(a), 1(b), 3, and 6, the lid body 2 includes an outer surface 20 which becomes a design surface; an inner surface 21 edged by a surrounding wall 22; a displacement portion 23 wherein one corner portion of a front side of the surrounding wall 22 is displaced on the inside; a shallow concaved portion 25 provided in the central part of the inner surface 21, on which a bottom face of the cup is placed; and the piece portions 26 provided to stand on right and left on a back side of the inner surface 21. In the displacement portion 23, an engagement hole 24 is formed to pass through, the engagement hole 24 engaging with and disengaging from a claw portion 52 of a locking claw composing the locking device 5. In the concaved portion 25, a plurality of ribs 25a is provide to stand. In each piece portion 26, there is provided an axis hole 27 passing through on the coaxial line, and a bearing concave portion 28 which is provided on an upper end surface and is located on the coaxial line, and whose upper part is open. In the aforementioned closed position, the lid body 2 is overlapped with the base 1, and in the aforementioned open position, the lid body 2 comes to be approximately horizontal (approximately orthogonal relative to the base 1) so as to be capable of supporting the cup from the lower side and to receive a bottom of the cup.

Figure 3:
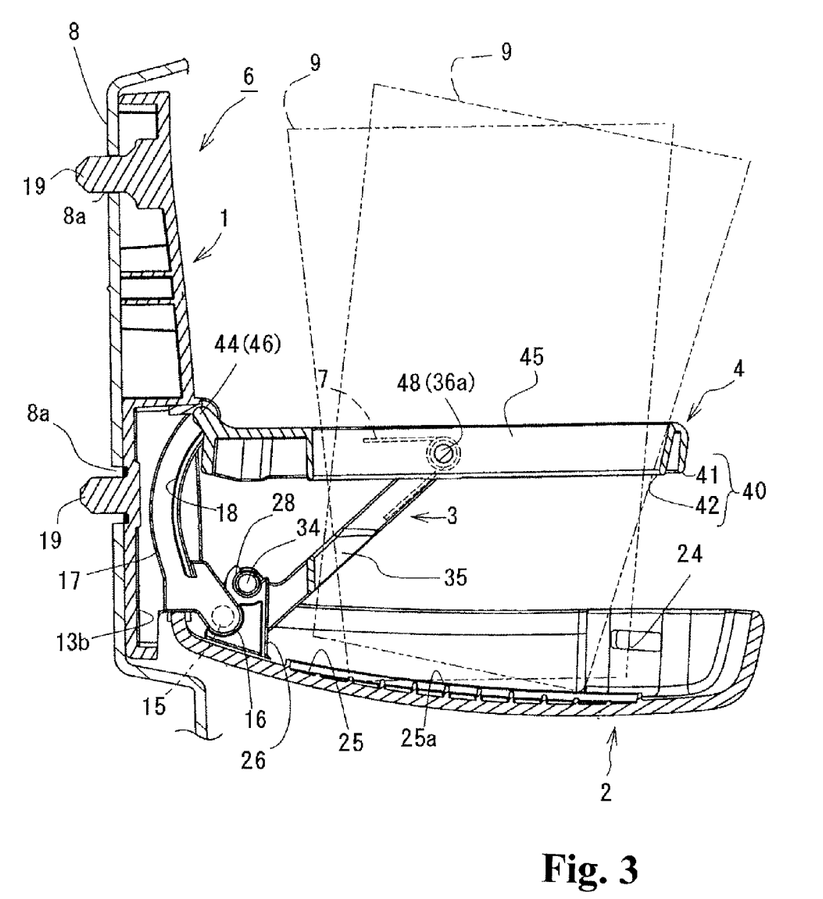
FIG. 3 is an enlarged sectional view taken along a line A to A in FIG. 2(a).
Figure 7A:
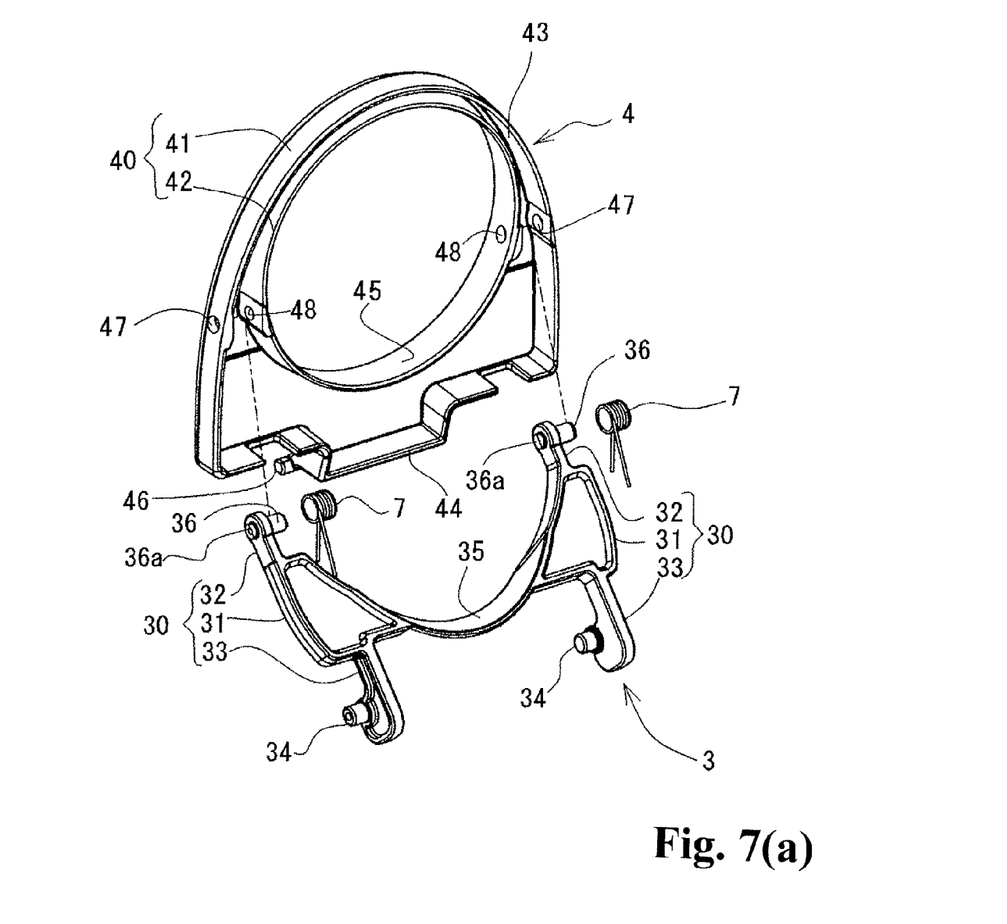
FIG. 7(a) is a diagram showing a state wherein a holder 4 and an arm 3 are exploded.
Figure 7B:
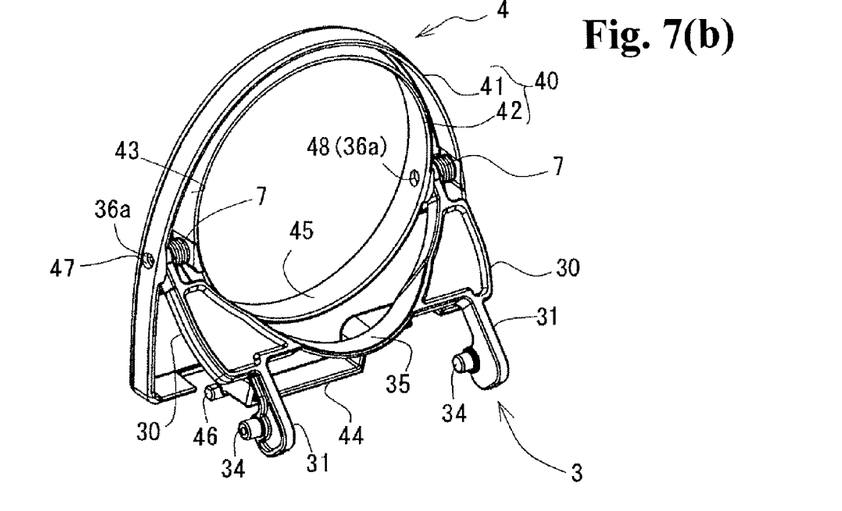
FIG. 7(b) is a diagram showing a state wherein the holder 4 and the arm 3 are connected.

As shown in FIGS. 3, 7(a), and 7(b), in the arm 3, both lateral portions 30 and a support portion 35 between the both lateral portions 30 are integrally formed. Both lateral portions 30 comprise intermediate plate portions 31; upper piece portions 32 protruded on the upper side of the intermediate plate portions 31; and lower piece portions 33 protruded on the lower side of the intermediate plate portions 31. Then, in the lateral portions 30, there is the aforementioned support portion 35 which is an elastically deformable thin-walled shape between the both intermediate plate portions 31. Also, in each upper piece portion 32, there are provided an axis portion 36 and a small protrusion 36a positioned on the coaxial line, and in each lower piece portion 33, there is provided an axis portion 34 located on the coaxial line. Among the above, as for the axis portion 36 and the small protrusion 36a, one upper piece portion 32 forms the axis portion 36 on the inner surface, and forms the small protrusion 36a on the outer surface. In an opposite manner, on the inner surface of the other upper piece portion 32, there is formed the small protrusion 36a, and on the outer surface, there is formed the axis portion 36. As for the axis portion 34, in one lower piece portion 33, there is formed the axis portion 34 on the outer surface, and in the other lower piece portion 33, there is formed the axis portion 34 on the inner surface. The support portion 35 is formed on an approximately same arc-like holding surface as one portion of a hole portion dividing a holding hole 45 on the later-mentioned holder side. As shown in FIG. 3, in the used state of the holder 4, the support portion 35 is located below the holding hole 45, and can abut against a surrounding portion disposed between the holding hole 45 and the concaved portion 25 of the lid body 2 in a circumference of the cup 9.

As shown in FIGS. 3, 7(a), and 7(b), the holder 4 comprises a main plate portion 40 forming the holding hole 45, and a base portion 44 provided on a back side of the main plate portion 40. The main plate portion 40 is edged by a collar-like surrounding wall 41, and divides and forms the holding hole 45 by a cylindrical portion 42 which is the same height as the surrounding wall 41. The surrounding wall 41 and the cylindrical portion 42 maintain a predetermined gap 43 in between, and also include axis holes 47 and axis holes 48 which pass through and formed on the coaxial line by conforming the axis holes 47 and the axis holes 48 to portions dividing the holding hole 45 into two equal parts. On both lateral faces of the base portion 44, there are provided axis portions 46 on the coaxial line. Each axis portion 46 is fitted into the corresponding guide groove 18 on a base side, and is slid in an up-and-down direction along the guide groove 18.

(Assembly)

When the above-mentioned respective member is assembled as the cup holder 6, after the arm 3 is connected to the holder 4 together with spring members 7, the arm 3 and the holder 4 are assembled to corresponding portions of the base 1 and the lid body 2. Namely, in a connecting operation of the above-mentioned members, as shown in FIGS. 3, 7(a), and 7(b), one side of the arm 3 fits the axis portion 36 into the axis hole 48, and fits the small protrusion 36a into the axis hole 47, and also the other side of the arm 3 fits the axis portion 36 into the axis hole 47, and fits the small protrusion 36a into the axis hole 48, so that the arms 3 are connected relative to the holder 4. At that time, in this structure, since the support portion 35 of the arm 3 is formed in a thin wall in an elastically deformable degree, the above-mentioned respective fitting operation can be easily carried out. Also, in a state wherein the spring members 7 are supported in the axis portions 36, one end of the spring member 7 is locked in a corresponding portion of the gap 43, and the other end of the spring member 7 is locked in a corresponding portion of the intermediate plate portion 31, so that, in the arm 3 and the holder 4, as shown in FIG. 7(b), the spring members 7 urge the holder 4 relative to the arm 3 in a direction of the used state, or urge the arm 3 relative to the holder 4 in a direction of standing up.

Figure 4A:
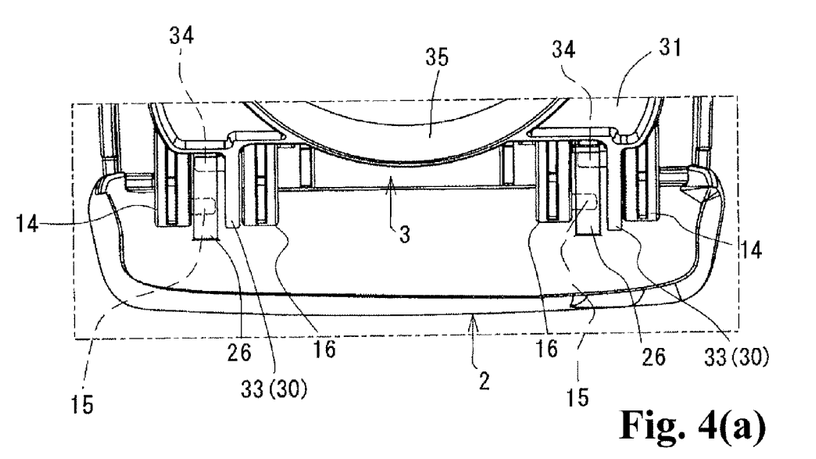
FIG. 4(a) is an enlarged diagram in which one portion of a B portion in FIG. 2(a) is cut away and enlarged.
Figure 4B:
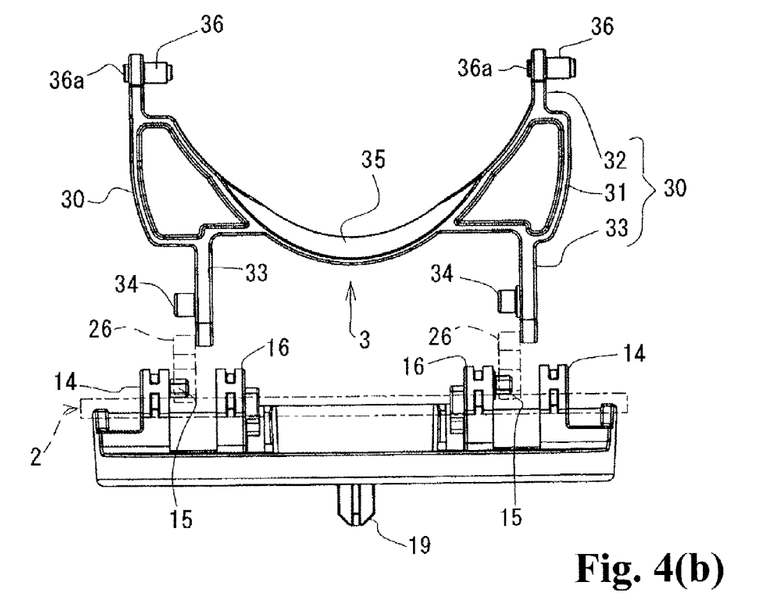
FIG. 4(b) is a diagram for explaining an assembly guideline of the cup holder 6.

From a connected state of the arms 3 and the holder 4 in FIG. 7(b), as shown in FIG. 3, after the axis portions 46 on both sides of the holder 4 are fitted into the corresponding guide grooves 18 of the base 1, as shown in FIGS. 4(a) and 4(b), the base 1 is turnably connected relative to the lid body 2 by the fitting each axis portion 15 into each axis hole 27, and also the arms 3 are turnably connected relative to the lid body 2 by the fitting each axis portion 34 into each bearing concave portion 28. In the connecting structure, as mentioned above, when the base 1 is connected relative to the lid body 2, and the arms 3 are connected relative to the lid body 2, respectively, as shown in FIG. 4(a), on the left side of the same figure, in a gap between the protruding piece portion 16 and the piece portion 26, there is inserted the lower piece portion 33 of the arm 3, and on the right side of the same figure, in a gap between the protruding piece portion 14 and the piece portion 26, there is inserted the lower piece portion 33 of the arm 3. Thereby, the base 1 and the lid body 2 cannot move laterally out of alignment so as to maintain a fitted state between the aforementioned axis portions and axis holes.

Incidentally, in the cup holder 6 of the present example, the axis portions 36 and 36a of the arm 3, and the axis holes 47 and 48 of the holder 4 form pivotal supporting portions (first pivotal supporting portions) which turnably connect the arm 3 and the holder 4. Also, the axis portions 34 of the arm 3 and the bearing concave portions 28 of the lid body 2 form pivotal supporting portions (second pivotal supporting portions) which turnably connect the arm 3 and the lid body 2. Incidentally, each pivotal supporting portion is not limited to the above, and for example, the bearing concave portions 28 may be axis holes.

(Locking Device)

The aforementioned locking device 5 includes a case 50 placed in the notch portion 12; a button 51 slidably disposed in the case 50; a locking claw 52 linked up with the button 51 through a pin 54; a protecting cover 53 placed on the button 51; and a spring member 55 urging the button 51 forward of the case 50.

Figure 2A:
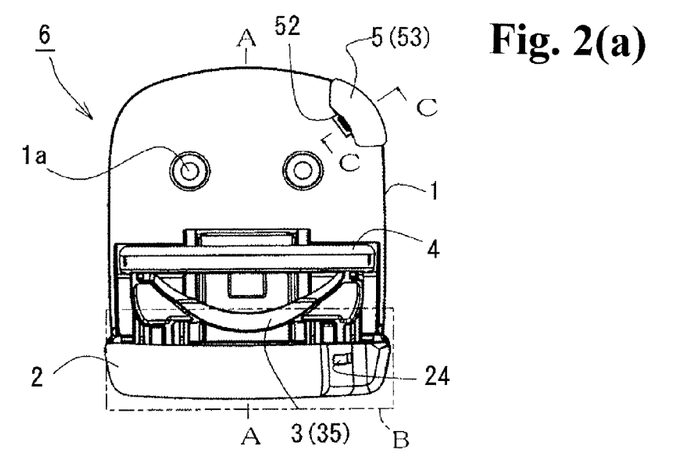
FIG. 2(a) is a front view of the cup holder 6.
Figure 2B:
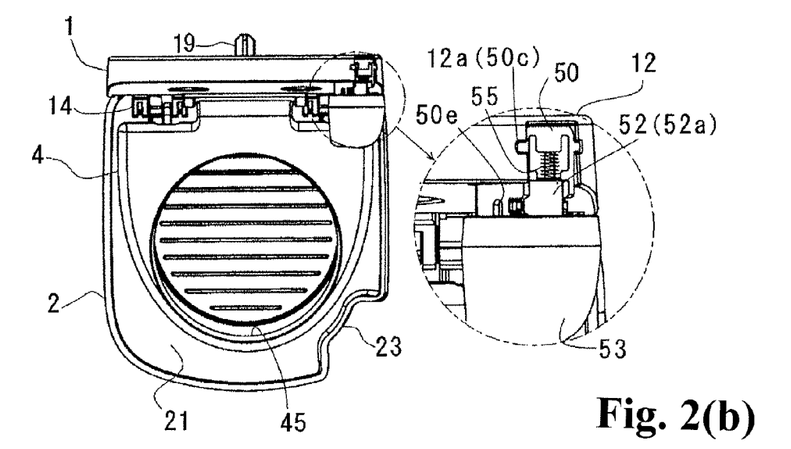
FIG. 2(b) is a plan view of the cup holder 6.
Figure 2C:
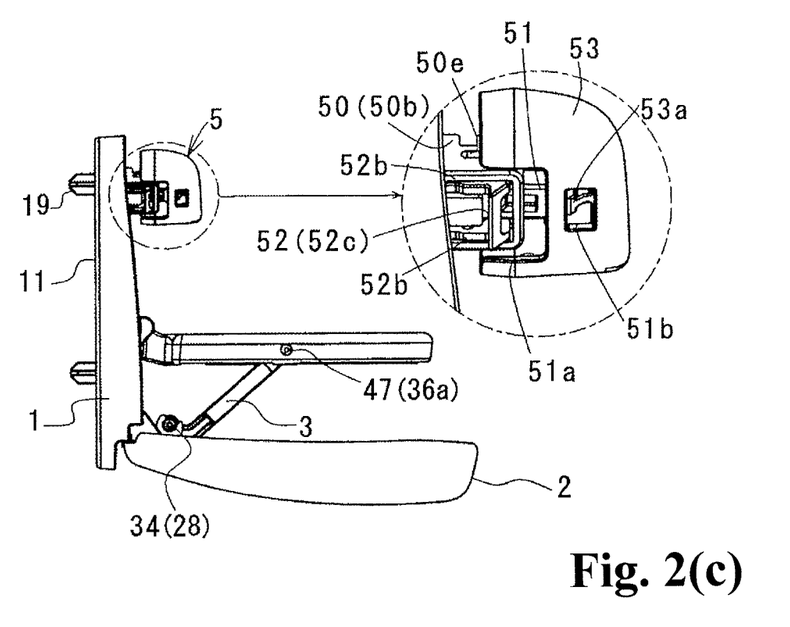
FIG. 2(c) is a side view of the cup holder 6.

The case 50 comprises a frame portion 50a, and a leg portion 50b integrally provided with the frame portion 50a on a back side (an attached portion 8 side) on a bottom face of the frame portion 50a. As being inferable from FIG. 5(a), in the frame portion 50a, a large opening is provided on an upper surface, and in one portion of the front side of a lower surface, there is also provided an opening. Also, on a front surface and a back surface of the frame portion 50a, there are provided openings in such a way as to be located on the same horizontal axis line. Furthermore, as shown in FIG. 2(b), the frame portion 50a includes guide grooves 50e oppositely provided on right-and-left lateral faces, and extending in a front-and-back direction. Then, the case 50 is engaged with the notch portion 12 in a state wherein ribs 50c protruding from both outside surfaces are engaged with the engagement grooves 12a. The leg portion 50b is engaged and fixed relative to the attachment hole 12c through elastic claws 50d provided on both lateral faces.

The button 51 forms a push portion 51a disposed outside the frame portion 50a; a body portion 51b disposed so as to protrude and enter with respect to the opening of the front surface of the frame portion 50a; and an axis portion 51c slidable along the opening on the back side of the frame portion 50a, on the coaxial line. Then, in the button 51, both ends of the pin 54, which is placed in a width direction of the body portion 51b, are fitted into the guide groove 50e on a case side, and the button 51 can slide back and forth only at a length of the guide groove 50e. Also, the button 51 is urged to the front of the frame portion 50a by an urging force of a coil spring which is the spring member 55 disposed around the axis portion 51c.

Figure 5A:
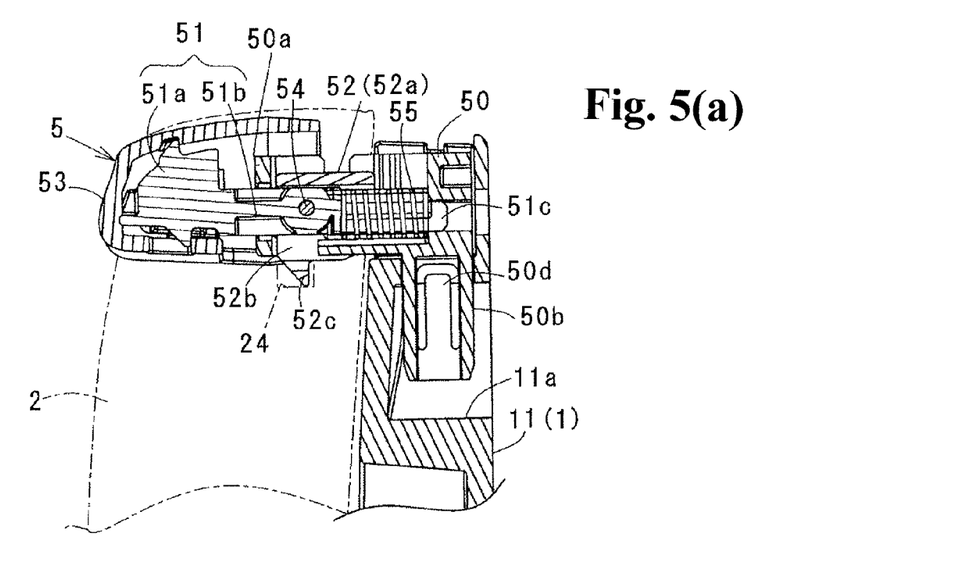
FIG. 5(a) is an enlarged sectional view taken along a line C to C in FIG. 2(a).

The locking claw 52 has an approximately C shape at an upper surface 52a and both lateral faces 52b; has a shape in which both front-side corner portions of the both lateral faces 52b are connected by a claw portion 52c; and includes oblique cam grooves 52d provided on the both lateral faces 52b. Then, the locking claw 52 is located inside the frame portion 50a, and after the body portion 51b and the axis portion 51c on a button side are disposed on the inside in such a way that the claw portion 52c protrudes outward from the opening on a lower surface side of the case, the aforementioned pin 54 is operated to be fitted into the guide groove 50e on one side, the cam groove 52d on one side, a hole of the body portion 51b, the cam groove 52d on the other side, and the guide groove 50e on the other side. Lastly, the cover 53 is integrated with the button 52 by an engagement structure. Incidentally, the cover 53 is for improving an external appearance and a visual quality, and there is no problem in a locking actuation even if the cover 53 is omitted. As shown in FIG. 5(a), in an assembly state, the button 51 protrudes forward to its fullest extent by the urging force of the spring member 55, and the locking claw 52 holds the lid body 2 in a descending position by a cam actuation of the cam grooves 52d relative to the pin 54, i.e., the claw portion 52c locks into the engagement hole 24 of the lid body 2 so as to hold the lid body 2 in the closed position.

(Actuation)

The above-mentioned cup holder 6 is in the used state in which the holder 4 becomes approximately horizontal in the open position of the lid body 2, and a bottom face of the cup 9 which is inserted into the holding hole 45 of the holder 4 is received by a number of the ribs 25a inside the concaved portion 25 of the lid body 2 so as to hold the cup 9. At that time, as shown in FIG. 3, in a state wherein the cup 9 is inserted into the holding hole 45, the lateral face of the cup 9 and the inner surface of the holding hole 45 come to an opposing state, and the lateral (the horizontal direction) movement of the cup 9 is controlled. Moreover, the lateral face of the cup 9 comes to an opposing state even relative to a surface of the support portion 35 of the arm 3 in a position separated from the holding hole 45 of the holder 4. Therefore, in the cup 9, the lateral (the horizontal direction) movement is controlled even by the support portion 35 of the arm 3. Thereby, for example, as shown in FIG. 3, even in a case wherein the cup 9 has inclined from a usual placed position due to an impact and the like, the lateral face of the cup 9 abuts against the support portion 35, so that the cup 9 cannot incline any more. Thus, according to the cup holder 6 with respect to the present embodiment, since the cup 9 placed on the lid body 2 cannot incline widely, the cup 9 can be held more stably.

In a process of switching to the closed position by turning the lid body 2, while the holder 4 is being pressed by the lid body 2, each axis portion 46 of the holder 4 moves downward along the guide groove 18. Thereby, the holder 4 inclines, and at the same time, an open angle between the holder 4 and the arm 3 is gradually narrowed against an urging force of the spring members 7. Finally, the lid body 2 is overlapped with the base 1, and the claw portion 52c of the locking claw of the locking device 5 is elastically engaged with the engagement hole 24, so that the lid body 2 is held in the closed position. In the closed position of the lid body 2, the arm 3 is housed in an inclined aspect in a direction wherein the arm 3 is located between the base 1 and the lid body 2 through the pivotal supporting portions and which comes to the housed state of the holder 4. Consequently, in the structure, when the lid body 2 is switched again from the closed position to the open position, a switching actuation to the used state of the holder 4 which is carried out through the arm 3 can be excellent.

Also, the urging force of the spring members 7 can be also utilized as the urging of the lid body 2 in an open positional direction through the arm 3 and the holder 4 so as to control the number of components and to be capable of improving the switching actuation of the lid body 2.

Figure 5B:
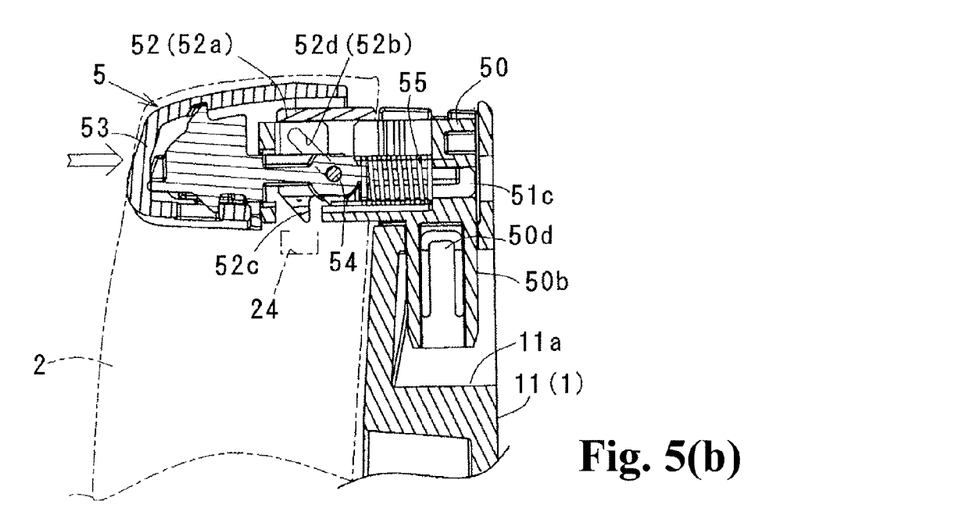
FIG. 5(b) is a diagram for explaining an unlocking operation of the cup holder 6.
Figure 6:
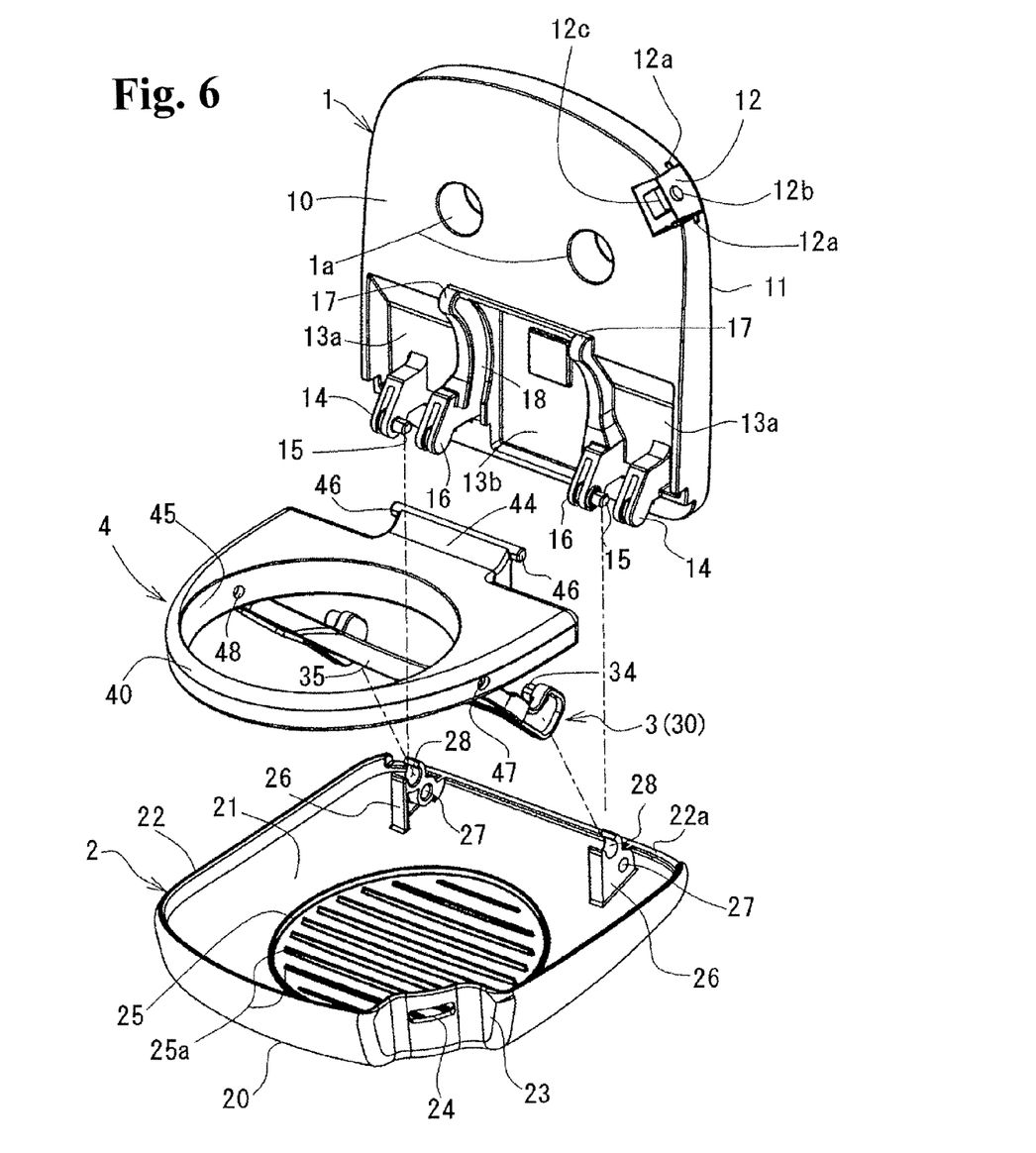
FIG. 6 is an exploded diagram showing a relationship between structural members of the cup holder 6.

More specifically, in a case when the cup holder 6 is used again, as shown in FIG. 5(*b*), when the button 51 is pressed in an arrow direction through the cover 53, the locking claw 52 can switch to an ascending position by the cam actuation of the cam grooves 52*d* relative to the pin 54, i.e., the claw portion 52*c* unlocks from the engagement hole 24 on a lid body side so as to be capable of switching the lid body 2 in the open position. Due to the unlocking, since the arm 3 and the holder 4 are urged in a direction of separating from each other by the spring members 7, the lid body 2 is automatically turned to the open position on the axis portion 15 as a supporting point by association with the movement of the holder 4 in the horizontal direction. In association therewith, the axis portions 46 in the guide grooves 18 moves from the bottom to the top, as shown in FIG. 3, so that the lid body 2 is switched to the used state, wherein the holder 4 comes to be approximately horizontal, through the arm 3.

As mentioned above, although the present invention has been explained using the embodiment, a technical scope of the present invention is not limited to a scope described in the aforementioned embodiment. It is obvious for a person skilled in the art that various modifications or improvements can be added to the aforementioned embodiment. For example, in place of the locking device 5 which excels in an appearance property and an operability in the cup holder 6, the present invention can be modified to have a composition described in the above-mentioned Patent Document 1 or Patent Document 2. Also, the cup holder of the present invention can be a type holding a plurality of cups as shown in, for example, the Patent Document 2 as well.

The present application is based on Japanese Patent Application No. 2010-098483 filed on Apr. 22, 2010, and contents thereof are incorporated herein as a reference.

EXPLANATION OF SYMBOLS

1 . . . a base (14 and 16 are protruding piece portions; 15 is axis portions; and 18 is guide grooves)
2 . . . a lid body (25 is a concaved portion; 26 is piece portions; 27 is axis holes; and 28 is bearing concave portions)
3 . . . an arm (30 is lateral portions; 31 is intermediate plate portions; 32 is upper piece portions; 33 is lower piece portions; 34 and 36 are axis portions; 35 is a support portion; and 36*a* is small protrusions)
4 . . . a holder (45 is a holding hole; 46 is guiding axis portions; and 47 and 48 are axis holes)
5 . . . a locking device (50 is a case; 51 is a button; 52 is a locking claw; and 54 is a pin)
6 . . . a cup holder
7 . . . spring members
8 . . . an attached portion (8*a* is a positioning hole portion)
9 . . . a cup

What is claimed is:

1. A cup holder, comprising:
a base adapted to be fixed to an attached portion;
a lid body provided switchably between a closed position and an open position by turning relative to the base, overlapped with the base in the closed position, and supporting a cup from a lower side thereof in the open position so as to receive a bottom of the cup;
an arm turnably attached to the base or the lid body;
a holder supported by the arm, and moving in association with turning of the lid body to become a housed state, in which the holder is housed between the lid body and the base, when the lid body is in the closed position, and to become a used state, in which the holder controls a lateral movement of the cup, when the lid body is in the open position; and
two pairs of protruding piece portions protruding from a lower side of an inner side of the base, each pair of protruding piece portions including one axis portion protruding from one of the pair of protruding piece portions in a same direction,
wherein the arm includes a support portion controlling the lateral movement of the cup in the used state of the holder,
the holder includes a holding hole controlling the lateral movement of the cup in the used state, and the support portion and the holding hole have an abutted surface with a substantially equal curvature respectively in a horizontal direction relative to the cup,
the support portion is disposed below the holding hole in the used state of the holder, and adapted to abut against a circumferential face of the cup disposed between the holding hole and the lid body, and
the lid body further comprises a pair of piece portions each having an axis hole to rotatably fit the one axis portion of the protruding piece portion and a bearing concave portion, and the arm has shaft portions each being rotatably disposed in the bearing concave portion.

2. A cup holder according to claim 1, wherein the arm further comprises two lateral portions laterally outside the support portion, each lateral portion including an intermediate plate portion, an upper piece portion protruding upwardly from an upper side of the intermediate plate portion, and a lower piece portion protruding downwardly from a lower side of the intermediate plate portion.

3. A cup holder, comprising:
a base adapted to be fixed to an attached portion;
a lid body provided switchably between a closed position and an open position by turning relative to the base, overlapped with the base in the closed position, and supporting a cup from a lower side thereof in the open position so as to receive a bottom of the cup;
an arm turnably attached to the base or the lid body;
a holder supported by the arm, and moving in association with turning of the lid body to become a housed state, in which the holder is housed between the lid body and the base, when the lid body is in the closed position, and to become a used state, in which the holder controls a lateral movement of the cup, when the lid body is in the open position; and
a locking device disposed on the base to hold the lid body in the closed position relative to the base,
wherein the arm includes a support portion controlling the lateral movement of the cup in the used state of the holder,
the holder includes a holding hole controlling the lateral movement of the cup in the used state, and the support portion and the holding hole have an abutted surface with a substantially equal curvature respectively in a horizontal direction relative to the cup, and
the support portion is disposed below the holding hole in the used state of the holder, and adapted to abut against a circumferential face of the cup disposed between the holding hole and the lid body.

4. A cup holder according to claim 3, wherein the locking device includes a case, a button slidably disposed in the case, a locking claw connected to the button, a protecting cover placed on the button, and a spring member urging the button toward a front side of the case, said locking claw engaging an edge of the lid body.

* * * * *